(12) United States Patent
David et al.

(10) Patent No.: US 6,493,683 B1
(45) Date of Patent: *Dec. 10, 2002

(54) OPEN COMMODITES EXCHANGE

(75) Inventors: Jacques S. David, Sarasota, FL (US); David Kricheff, Closter, NJ (US)

(73) Assignee: Netrade, LLC, Sarasota, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,815

(22) Filed: Aug. 23, 1999

(51) Int. Cl.[7] ............................................. G06F 17/60
(52) U.S. Cl. ........................................ 705/37; 705/39
(58) Field of Search .............................. 705/35–37, 39; 235/379

(56) References Cited

U.S. PATENT DOCUMENTS

| | | | | |
|---|---|---|---|---|
| 4,903,201 A | * | 2/1990 | Wagner | 705/37 |
| 5,063,507 A | * | 11/1991 | Lindsey et al. | 705/26 |
| 5,426,281 A | * | 6/1995 | Abecassis | 235/379 |
| 5,615,269 A | * | 3/1997 | Micali | 705/7 X |
| 5,671,364 A | * | 9/1997 | Turk | 705/37 |
| 5,809,483 A | | 9/1998 | Broka et al. | |
| 5,873,071 A | * | 2/1999 | Ferstenberg et al. | 705/36 X |
| 5,905,974 A | * | 5/1999 | Fraser et al. | 705/37 |
| 5,918,218 A | * | 6/1999 | Harris | 705/37 |
| 6,058,379 A | * | 5/2000 | Odom et al. | 705/37 |

FOREIGN PATENT DOCUMENTS

| WO | WO 98/58333 | * 12/1998 |
|---|---|---|

OTHER PUBLICATIONS

No Author, "i–Escrow Inc. Introduces New Transaction Management Service to Boost Confidence and Convenience in Web Commerce Between Individuals" PR Newswire. Sep. 21, 1998.*

Welles et al. "The Future of Wall Street: Why Our Financial System Will Never be the Same" Business Week p 119, Nov. 5, 1990.*

Richardson "Is This a Time to be Thinking About One–Day Settlement?" Investment Dealers' Digest p 34, Oct. 13, 1997.*

* cited by examiner

Primary Examiner—M. Kemper
(74) Attorney, Agent, or Firm—Gottlieb, Rackman & Reisman, P.C.

(57) ABSTRACT

A system and method of trading commodities includes an open commodities exchange server which can be accessed by registered customers. Registration of the customers with the system includes providing information to the system which identifies the customers and the deposition by customers of commodities with one or more custodians. Orders associated with commodities are posted by the server as offers on a data base after they have been securitized. Registered customers can then review the offers and generate responses thereto. These responses are also securitized to insure that the proper securities or assets are on deposit with the custodian. The custodians having their own servers.

13 Claims, 4 Drawing Sheets

OPEN COMMODITES EXCHANGE

BACKGROUND OF THE INVENTION

A. Field of Invention

This invention pertains to a flexible electronic trading system which enables buyers and sellers to trade commodities whereby the commodities traded are authenticated and securitized by a third party. The invention further pertains to a method of trading in which entities, including individual as well as institutional, corporate and fiduciary investors and traders can purchase and sell commodities without resorting to a traditional exchange environment where third parties in addition to the buyer and seller must participate.

B. Description of the Prior Art

Any item that can be traded is a commodity. Thus, commodities include intangibles such as stocks, bonds and options, as well as tangibles such as gold, real estate and works of art.

There have always been means to trade commodities. In earlier times, when commerce was less complex, it was a simple matter for buyer and seller to meet face to face and consummate a sale with physical assurance that what was being traded had been verified. As commerce became more complex, it became necessary for institutions such as stock exchanges and third parties such as brokers, agents and market makers to facilitate the buying and selling and to assure the validity of that which was sold.

Most recently the trading of intangibles have been facilitated by the increase in the number and variety of form of exchange systems, most notably the electronic communication networks ("ECN"s). Their existence has greatly enhanced the economic efficiency of these markets by providing faster trading and more open access to specific items being traded.

The individual investor, however, remains removed from the direct trading environment. The individual investor must deal with a variety and number of people when negotiating and consummating a transaction with another individual. Thus, when an individual decides to buy or sell a commodity, he still must place this order with another party who will decide how to process this order. This results in costs of handling each transaction by a number of people and a time delay in execution of the transaction. The delay alone can be costly in a dynamic market. Also, if the individual wants to buy or sell a commodity, such as a stock or bond, which is seldom or infrequently traded, he has no means to directly communicate with a potential buyer or seller except through a third party. This third party often makes a market in the commodity, allowing for arbitrary economic large spreads between the bid and ask and resultant purchase and sale prices.

The individual investors have been left out of this trading environment because none of the existing systems either allow them to trade with each other (or directly with other entities) or have the means necessary to validate investors' ability to consummate a transaction. It is this understanding of these problems which provided the impetus for the present invention.

Some automated systems related to commodities trading and the like are described in the following references:

U.S. Pat. No. 4,751,640 describes an automated investment system for investment banks in which idle funds of customers are invested in commodities designated by the customer.

U.S. Pat. No. 5,262,942 describes a financial transaction network in which mutual funds are maintained in different currencies and are transferred between customers at will.

U.S. Pat. No. 5,809,483 describes an online transaction processing system which provides current trading information to customers.

U.S. Pat. No. 5,845,266 describes a network utilized to match buy and sell orders for commodities.

U.S. Pat. No. 5,873,071 describes an order management system for negotiating the exchange of commodities.

U.S. Pat. No. 5,890,138 describes a computer-based auction system.

U.S. Pat. No. 5,897,621 describes a system for buying goods or services from a merchant using multiple currencies.

U.S. Pat. No. 5,903,878 describes a system for electronic commerce in which each transaction is validated by using a special transaction identifier.

U.S. Pat. No. 5,905,974 describes a system for auctioning fixed income commodities.

U.S. Pat. No. 5,915,023 describes a system for selling goods or services through a third party.

OBJECTIVES AND SUMMARY OF THE INVENTION

In view of the above, it is an object of the present invention to provide a system which provides total ability of individual investors to purchase and sell commodities directly between each other with no effective delay between the time of order and the time of execution.

A further objective is to enable the purchase and sale of commodities to take place with the elimination of the spread between the selling price and the purchase price presently common to existing transactions between individual investors.

A further objective is to provide a trading system which can be used to trade commodities between buyers and sellers without the need for a conventional commodities exchange and associated commission charges and/or transaction fees.

A further objective is to provide a trading system in which every trade or transaction is automatically secured to insure the comfort and trust of all the participants in the trade.

Yet a further objective is to provide an automated commodities trading and method in which a large number of transactions can be completed rapidly and economically.

Yet another objective is to provide a trading system in which commodities which are rarely traded are readily available to a potential buyer or seller.

A further objective is to increase liquidity of less frequently traded commodities by making known their availability for purchase and sale.

Other objectives and advantages of the invention will become apparent from the following description.

In its broadest aspect, the subject invention pertains to an automated commodities trading system including an open commodities exchange server (OCES) which can be accessed by a plurality of customers and at least one custodian in communication with said OCES. Commodities, funds and other assets used for trading are deposited by the customer with the custodian.

The customers can participate in two kinds of trades: placing orders for commodities or responding to offers by other customers. When a customer places an order on the OCES, a request is sent to the custodian to securitize the order, meaning that the custodian verifies that the customer has the proper commodities, assets or funds to meet the order, and, optionally segregates or otherwise separates the same to an escrow account. After an order has been securitized, it is posted to an appropriate data base and becomes an offer.

A response to an offer is securitized in the same manner as an order. Once a response to an offer is securitized, the offer is executed and the buyer and seller customers, as well as the custodian(s) are notified, and the order is settled.

Briefly, a system for trading commodities includes an open commodities exchange server (OCES) provided to receive a plurality of orders to buy and sell commodities from a plurality of customers. The OCES is also coupled to one or more custodians. Before being allowed to trade, each customer must deposit with a corresponding custodian the funds, commodities and other marketable assets the customer may wish to use in the purchase and sale of commodities through the OCES.

Whenever a customer initiates a trade through the OCES, OCES requests confirmation and securitization from the appropriate custodian, whereby the custodian segregates or otherwise blocks the appropriate assets of the customer and acknowledges the same to OCES. In this description, the term 'trade' is used to refer generically to any conventional commodities exchange, including either (1) an order to buy or sell commodities; or
(2) a response to a posted order to buy or sell commodities. Moreover, an order to sell a commodity could be a 'short' order covering a commodity which is not in the possession of the customer. Short orders are securitized by other assets of the customer, or by other means as prescribed, for example, by government regulations. Once confirmation is received, the offer (if any) is posted on the OCES.

The settlement for the trade is performed by the custodians.

The custodian may be an independent entity; it may be associated with banks, brokerage houses or other similar entities normally involved in trading or may be established specifically for this purpose.

Generally, the present invention covers an automated commodities trading system for trading a commodity between a first and a second customer with an asset or payment being deposited with a custodian on the account of said second customer, said commodity being deposited with a custodian on the account of said first customer, said system including an open commodities exchange server (OCES) arranged and constructed to communicate with all parties involved, and to manage requests to buy and sell commodities from said customers. A custodian server is associated with the custodian and can access data identifying assets and commodities held by said custodian.

The OCES generates messages to said custodian servers in response to requests to confirm that the custodians have said assets and commodities in escrow. The custodian receives the messages and generates an acknowledgment based on the data identifying said assets. The OCES generates a transfer message in response to said acknowledgments to transfer said stock to aid second customer and payment to said first customer.

More specifically, a commodities trading system for trading a commodity between a first and a second customer is disclosed having a first data base holding data indicative of a commodity being held by a custodian on behalf of said first customer; a second data base holding data indicating the assets of said second costumer (or other indicia showing that he has the ability to pay), an open commodity exchange server (OCES) being in communication with said first and second data bases and said first and second customers and receiving a request for transferring said commodity from said first to said second consumer, the OCES being arranged to confirm that said first commodity is securitized. The OCES is also arranged to confirm that said second customer has assets to pay for said commodity by contacting said second data base. The OCES is constructed and arranged to allow said transfer only after confirming that the transaction is secure.

The system may also include a first custodian server associated with a first custodian, said first custodian server being connected to one of said first and second data bases. The custodian is associated with said first data base and is adapted to securitize the commodity.

In addition, a method of trading commodities on an automated distributed system including an open commodities exchange server (OCES), a first data base indicating that a commodity is deposited with a custodial facility on behalf of a first customer and a second data base indicating that a second customer has assets to pay for commodities presented, the method including generating a request to said OCES to trade said commodity between said first and said second customers; generating a first confirmation request by said OCES that said first customer has rights to said commodity; generating a second confirmation request by said OCES that said second customer has the required assets; generating a first response from said first data base to indicate that said first customer has rights to said commodity; generating a second response from said second data base to indicate that said second customer has the assets; and responsive to said first and second responses, transferring said commodity from said first to said customer in return for said assets. The method further includes generating an offer to sell said commodity by said first customer and an offer to buy said commodity by said second customer; and comparing said offers by said server and initiating said transfer if said offers meet a predetermined criteria. Preferably, prior to confirmation, said commodity and the corresponding assets are securitized by the corresponding custodians.

As part of this method, prior to any trading, each customer may be required to register with the server and with a custodian. As part of this registration, the customer gets an identification and password for the system. The customer must also deposit with the custodian his commodities. Before he can buy any commodities, a customer must also register with a custodian and either deposit funds or other assets or provide sufficient information to receive a credit rating for a particular amount. Since most customers want to buy and sell commodities, it is expected that they deposit with a custodian their commodities and assets at the same time. Prior to any trade by a customer to sell a commodity the server receives confirmation through the appropriate custodian it has custody of the subject commodity and therefore that the customer has the right to sell the same and that the subject commodity have been securitized. Prior to any buy trades, the server obtains confirmation from the appropriate custodian (which may be the same custodian as the one confirming the commodity) that the customer has deposited sufficient assets to purchase the funds and that these assets have been securitized. In effect this confirmation indicates that the customer has the ability to pay for the commodities he is wants to buy.

Finally, a method of trading commodities is presented by generating a request to trade a commodity between said first and said second customers; confirming that said first customer has rights to said commodity (or assets to pay for the same if he is selling short) and that the commodity (or assets) has been securitized; confirming that said second customer has the assets for paying for said commodity and that said assets have been securitized; and if both conditions are met, transferring said commodity from said first to said second customer.

DETAILED DESCRIPTION OF THE INVENTION

Figure 1:
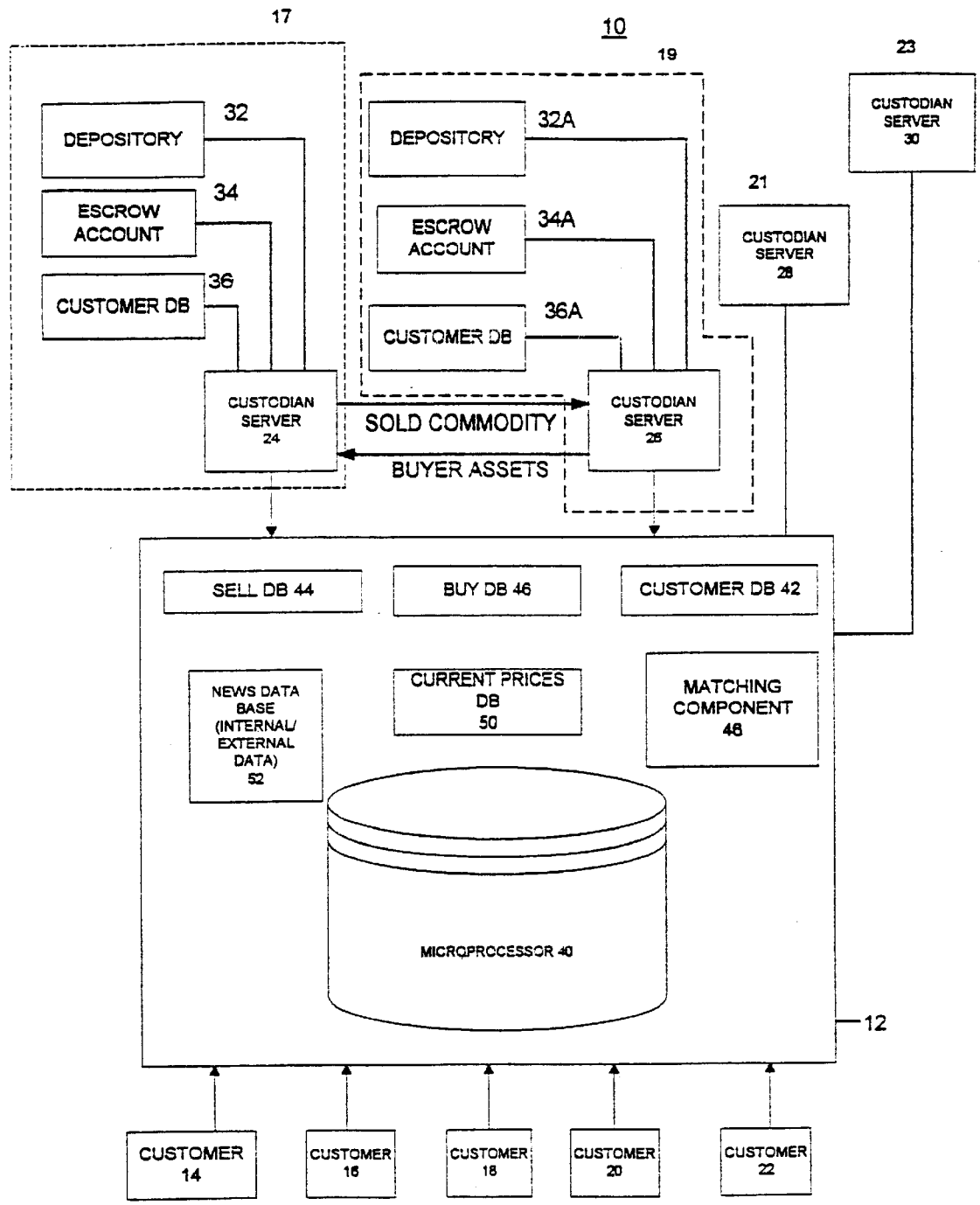
FIG. 1 shows a block diagram of an open commodities exchange system constructed in accordance with this invention.

Referring now to FIG. 1, a system 10 for performing commodities trading in accordance with this invention includes an open commodities exchange server (OCES) 12, with a plurality of customers 14, 16, 18, 20, 22 being connected to the OCES 12 to execute trades. The connections between the customers and the OCES 12 may be provided by secure telephone lines, via the Internet or any other similar means. The customers 14, 16, 18, 20, 22 may be individual investors, small or large traders, etc., each having a PC or other means of accessing the OCES 12, such as a smart or a dumb terminal.

Also connected to the system 10 are a plurality of custodians 17, 19, 21, 23. The number of these custodians may vary depending on the size and physical or geographical extend of the system 10. A custodian, or at least its functions, may also be incorporated into the OCES 12. It is contemplated at this time that the custodians will be associated with banks, brokerage firms, or other financial institutions of facilities traditionally involved in receiving and storing commodities. Each custodian includes a custodian server, an escrow account and a customer data base as discussed in more detail below. Only the servers (28, 30) for custodians 21, 23 are shown for the sake of clarity.

The depository 32 may represent a physical chamber such as a vault in which the actual notes corresponding to commodities and other assets are stored, together with a data base containing an inventory of these notes, including their ownership, etc. In the future, it is expected that the notes will be eliminated and the depository will consist only of the data base.

As seen in FIG. 1, OCES 12 includes a microprocessor 40 which performs all the data processing associated with the functions of OCES 12. In addition, OCES 12 further includes a customer data base 42, a sell data base 44, a buy data base 46, a matching component 48 a current commodity posting data base 50, and a news data base 52. The operation and function of each of these elements will become apparent from the following description.

Before a customer can access the system 10, he must be registered. This registration may be performed either through the OCES 12 or directly through one of the custodians. Initially, if the customer is interested only in buying commodities, then registration consists of depositing assets (including funds). Assets are transferred into the depository 32, while the funds are credited to his account. A protocol is preferably established to update the customer's account. Alternatively, the customer may establish credit as a means of paying for commodities.

If a customer initially wants to sell commodities then during registration to the custodian, in addition to providing personal information, the customer also surrenders the subject commodities. These commodities are stored in the depository 32 and the customer data base 36 is adjusted to indicate that the commodities are on deposit in the customer's account.

It is expected that most customers deposit their commodities, assets and funds at the same time.

After the customer has traded commodities using system 10, any commodities thus acquired can also be placed in the depository 32. Alternatively, the customer may select to receive and store the commodities himself, however, in this case, the acquired commodities must be re-deposited before initiating any sell orders.

Once a customer is properly registered, his profile, including name, address, password, portfolio information and other data is stored on customer data base 42.

Figure 2:
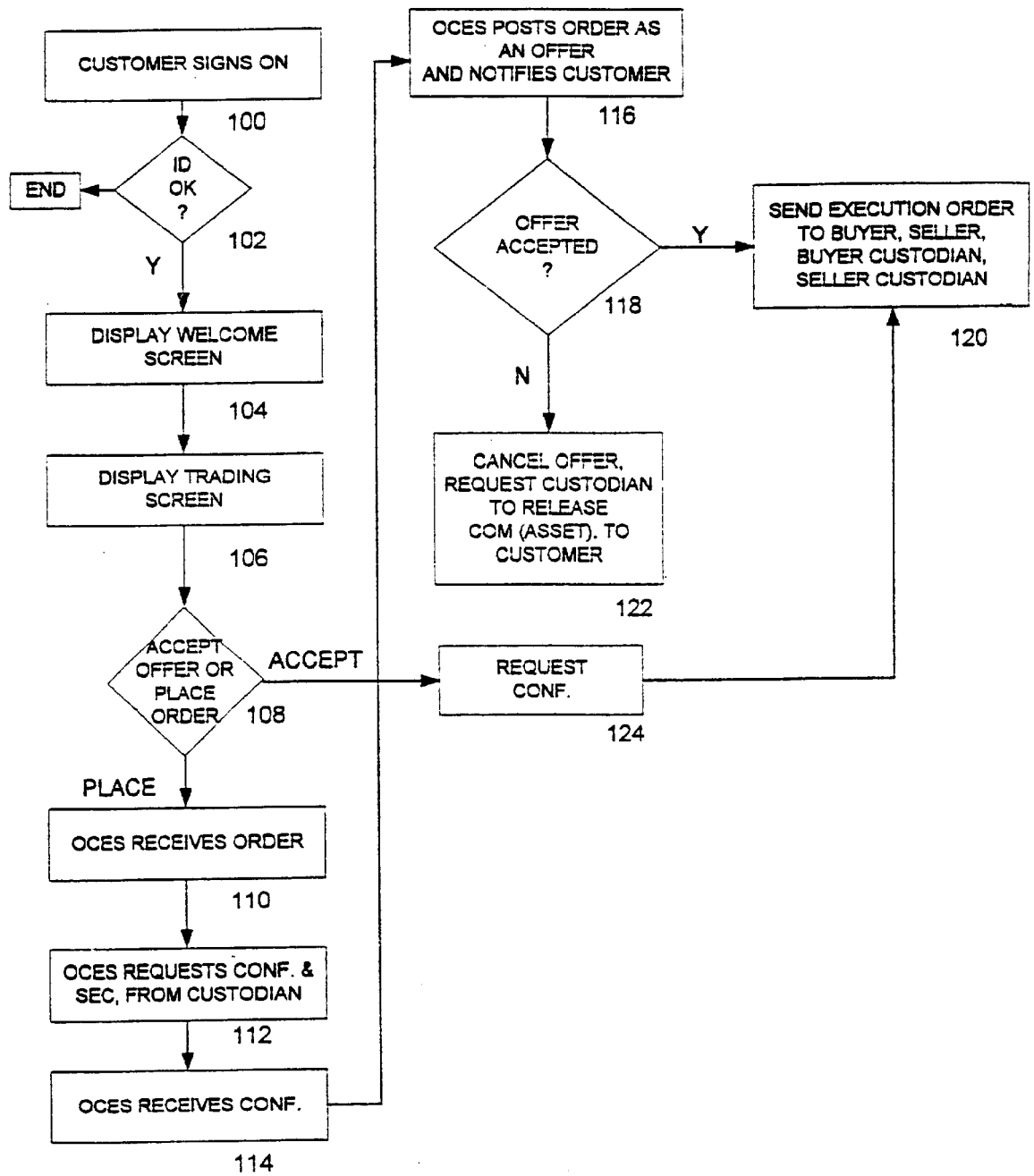
FIG. 2 shows a flow chart illustrating how the system of FIG. 1 handles a trade order by a custom.

A customer 14 can make a trade on the OCES 12 as shown in FIG. 2. In step 100, the customer contacts OCES 12 using a standard PC or other similar device and attempts to sign on to get access to the subject trading service. In step 102, the OCES 12 requests the customer to provide the customer's identification name and password. The customer's PC can provide this information automatically or the information may be entered manually by the customer. The identification and password are checked by the OCES 12 by comparing the same with the information from the data base 42. If the customer is not a registered user, his request for access is rejected. (Step 103).

Figure 3:
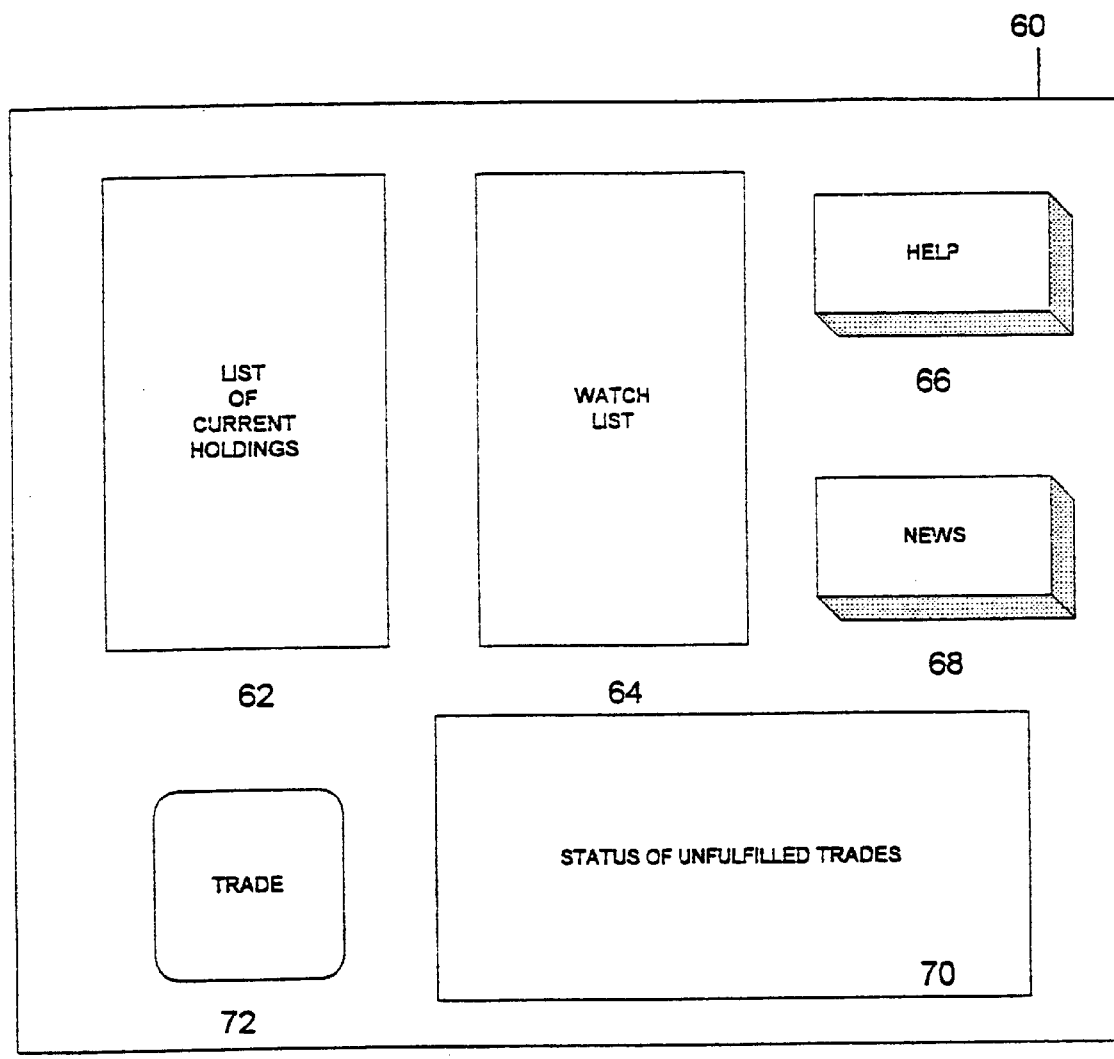
FIG. 3 shows a typical welcome screen for a customer after he has signed onto the open board server.

If the customer 14 is accepted as a registered user, the OCES 12 sends to his PC data for a welcome screen which is displayed for customer 14 (step 104). A typical welcome screen may look as illustrated in FIG. 3. On this screen 60, the customer is provided with various information preferably tailored to his needs and his personal profile. For example, the screen may include a zone 62 used to display a list of the current holdings of the customer. Zone 64 may be used to show a watch list, i.e., a list of commodities that the customer wants to monitor on a regular basis.

Two buttons 66, 68 may be provided to allow the customer to obtain further information. Button 66 may be used to obtain instructions on how to use the system while button 68 may be used to request financial news. When button 66 is selected, the customer can get instructions on how to use the system 10. When button 68 is selected, the OCES 12 downloads financial news to the customer. The OCES 12 obtains these financial news as well as current commodity price information from data base 50. This information is provided by a news data base 52. The data in this data base is collected by the processor 40 either from its own data bases, such as current posting data base 50, or from external sources through the Internet.

A zone 70 is also provided in which the customer can monitor the progress and status of his orders. For example, the zone 70 may contain a list of all the buy and sell orders by the customer, the current price of the corresponding commodity, and so on.

Finally a button 72 is provided to allow the customer one means of initiating the trading process, as described below. Obviously, the screen in FIG. 3 is merely exemplary and many other variations and formats may be used to provide the information to the customer.

Once the welcome screen is shown, the customer may initiate a trade in a number of different ways. For example, the customer may review his watch list in zone 64 and when he wants to trade a particular commodity, he chooses that commodity from the list. Once this choice is made, a trade screen is displayed (step 106). This screen shows a list of all buy and sell offers for the selected commodity as posted in data bases 46 and 44 respectively. Optionally, the trade screen may also show the current buy and sell orders from others, possibly conventional, exchanges. In step 108, the customer may select one of the offers and thereby indicate that he would like to accept the offer. If the customer does not like any offers that are listed, he can then place his own order. If the customer wants to trade a commodity that is not listed in his watch list, he first selects trade zone 72, and then identifies the commodity that he is interested in.

In step 110, the OCES 12 receives the order.

In step 112, the OCES 12 contacts the corresponding custodian, for example, custodian 17 handling this particular customer and requests a proper confirmation.

Figure 4:
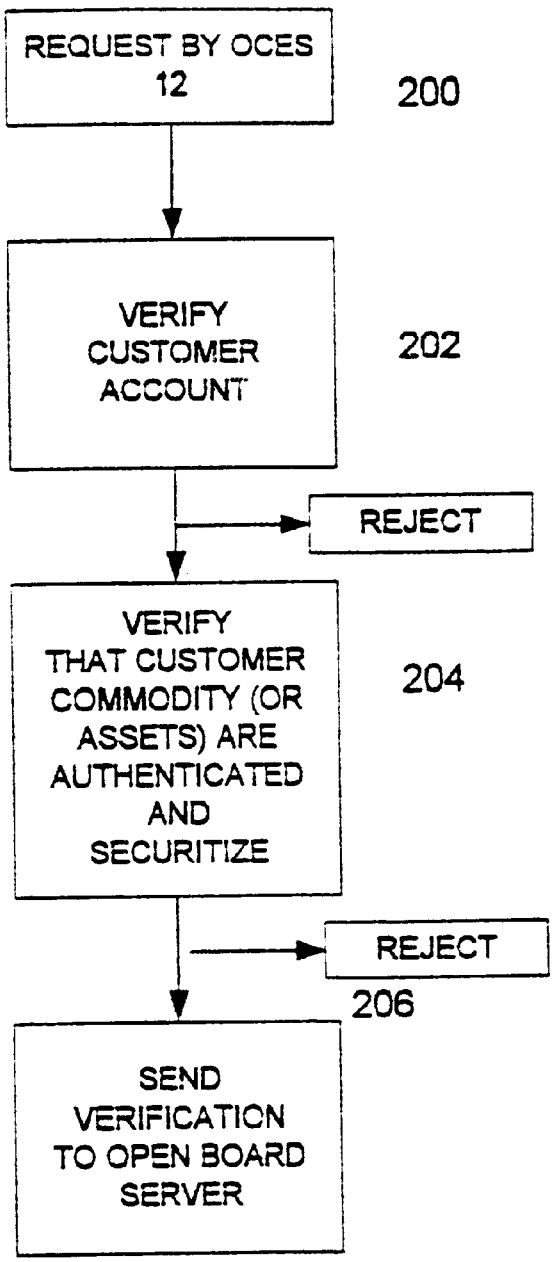
FIG. 4 show a flow chart for confirming the status of a customer by a custodian server.

The process performed by the custodian 17 depends on the nature of the order. For example, in FIG. 4, the custodian server 24 of custodian 17 receives the order for the sale of a stock X in step 200. In step 202, the custodian server 24 verifies that customer 14 has registered at least N of stock X commodities with custodian 17. In step 204, the custodian server 24 verifies that custodian 17 has registered and has in its custody at least N shares of stock X. The custodian server 24 also places a block, or segregates the shares N of stock X in the account of customer 14 or alternatively, transfers these shares to the escrow account 34. In this manner, the stock specified by the order is securitized, so that it cannot be touched while the order is processed.

In step 206, the custodian server 24 returns a message to OCES 12 indicating that the customer 14 has at least N shares of stock X and that this commodity is in the possession of custodian 17 and that these shares have been securitized. If the customer 14 is not recognized or does not have enough or any shares of stock X registered with custodian 17, then the custodian server 24 returns a message to the OCES 12 declining to confirm the request.

If the subject order is to buy a commodity or to sell a commodity short, the custodian segregates or allocates assets or funds of the customer to the escrow account in anticipation of the prospective trade.

In FIG. 2, in step 114, if the OCES 12 receives confirmation from the custodian server 24, that the commodities (or the assets) for order has been securitized. If the OCES 12 receives a rejection of the trade request then a rejection message is sent to the customer.

In step 116, the OCES 12 posts the sell order in a sell data base 44 (FIG. 1) as an offer and notifies the customer of the posting.

In step 118, all offer acceptances are monitored by the OCES 12. If the subject offer is accepted, then in step 120 an execution order is sent to the buyer, the seller, and the appropriate custodian(s). The custodians then settle the order. If the offer is not accepted within the predetermined time, then in step 122, the order is cancelled and removed from the appropriate data base (44 or 46) and the custodian is requested to release the subject commodity (or assets) to the customer's account.

Optionally, in step 118, a matching component 48 is accessed. This component 48 uses a predetermined algorithm, to compare the sell orders from the data base 44 and the buy orders from data base 46 and if no match is found, negotiates a match which is fair to both parties. If matching is found, the matching component 48 insures that the new order is matched to the earliest corresponding offer.

If in step 108, the customer selects an offer listed in zone 64 and elects to accept it, then in step 124 a request is sent to the appropriate custodian for confirmation. Once again, the custodian checks if the customer has either the required commodity or assets (depending on the nature of the order). Once securitization is accomplished, the custodian sends a confirmation to the OCES 12. The order corresponding to the offer accepted by the customer 14 is then executed in step 120 as described above.

Once an order is executed, a settlement has to be performed to effectuate the commodity transfer. The settlement is preferably conducted between the custodian servers (for example, 17 as the custodian for the seller and 19 as the custodian for the buyer) without the involvement of the OCES 12, although the OCES may be notified of these settlements so that it can keep track of the transactions and their status. Alternatively, all the communications between the custodian servers 17, 19 can be performed through the OCES 12.

As previously mentioned, in step 120, both custodians 17, 19 are notified of the order to be settled. The order, the two custodians 17, 19 exchange confirmation signals to verify that custodian 17 is indeed the seller custodian and has the securitized commodity, and that the buyer's server base securitized the buyer's assets. Next, the two servers 17,19 exchange the subject commodity in return for the assets, and the depositors 32, 32A, escrow accounts 34, 34A and customer data bases 36, 36A are adjusted to reflect this transaction.

The term "server" is used generically to describe any microprocessor based device, apparatus or process capable of performing the functions described herein. It should be understood that the various functions and sequence of steps described above and attributed to the servers 12, 24, 26 have been provided only for the purposes of clarity and that some of these functions and steps can be performed by other elements of the systems. For example, a customer may be registered with more than one custodian server. Alternatively, a single custodian server may be provided to handle all the transactions. If separate custodians are used, different custodians may be associated with different functions or operations. For example, some custodians may be dedicated to handle only commodities while other custodians may be dedicated to handle only assets and credit information. Some custodians may be provided to handle both commodities and assets. Finally, some custodians may be dedicated to managing only particular types of commodities (i.e. stocks, bonds, or tangibles). Moreover, the steps for performing a trade may also be performed in a different sequence.

In an alternate embodiment of the invention, the customer may be given the option of sending the order to a brokerage-type service. The order is then processed by a broker through a conventional exchange.

The system 10 described may be offered to customers on various terms. For example, the customers may be charged a flat fee, may be charged each time they post an order, and/or may be charged for each executed order. The charges may be calculated by the OCES 12 or by the other servers.

It is clear from the above description that the subject invention provides several advantages over the prior art systems using standard exchange. More particularly, the system allows individuals to trade directly with each other. Trades can be matched and the orders can be executed very rapidly so that virtually there is no time delay between the time of each order and its execution. Assets and commodities are verified and securitized on both sides of the transaction. Trades may be made without a spread between the buy and the sell price. Trades are posted and executed without paying commissions or other fees to third parties (i.e., brokers, dealers).

Numerous other modifications may be made to the invention without departing from its scope as defined in the appended claims.

We claim:

1. A commodity trading system for allowing commodity trading between a first and a second customer, wherein each commodity has a variable exchange rate, said system comprising:

a first data base holding data indicative of a commodity being held by a custodian facility on behalf of said first customer;

an exchange server being in communication with said first data base and to said first customer and receiving an order for sale of said security, said exchange server being arranged to confirm that said first customer has rights to said commodity by contacting said first data base and to securitize said commodity for said order;

said system adapted to display said order to a second customer a second data base holding data indicating that said second customer has deposited with the same or a different custodian facility assets to pay for commodities; and said exchange server also being in communication with a second data base and to said second customer and receiving an order from said second consumer to exchange its assets for those displayed by the first customer, said exchange server being arranged to securitize the assets of the second customer;

wherein said exchange server is constructed and arranged to lock the commodities and initiate the settlement of the trade.

2. The system of claim 1 further comprising a first custodian server associated with a custodian facility, said first custodian server being connected to one of said first and second data bases.

3. The system of claim 2 wherein said first server is associated with said first data base and is adapted to provide a lock on said security to prevent said security from being offered again.

4. A method of trading commodities on an automated distributed system including an open commodities exchange server (OCES), a custodian securitizing and holding a commodity having a variable value and assets to pay for commodities, said method comprising:

depositing a commodity with a custodian, placing an order for said OCES to trade said commodity by a first customer;

sending a command to said custodian to securitize said commodity for that order only;

displaying said order for viewing by customers, generating an acceptance associated with said order for said OCES by a second customer to exchange said commodity for assets;

generating a command to lock said assets from further transactions; and transferring said commodity between said first and said second customer.

5. The method of claim 4 further comprising generating an offer corresponding to said order after said order has been securitized.

6. The method of claim 5 further comprising presenting said offer to said second customer, said response being generated after said offer is presented to said second customer.

7. The method of claim 6 further comprising generating a plurality of orders for said commodity by a plurality of customers, posting said orders as offers on a data base of said OCES and presenting said offers to said second customer.

8. The method of claim 7 wherein said response is generated by selecting one of said orders presented to said second customer.

9. A method of trading commodities on an automated distributed system including an exchange server, a custodian securitizing and holding a commodity having a variable value and assets to pay for commodities, said method comprising:

depositing a commodity with a custodian, placing an order to trade said commodity by a first customer;

sending a command to said custodian to securitize said commodity for that order only;

displaying said order for viewing by customers, generating an acceptance associated with said order by a second customer to exchange said commodity for assets;

generating a command to lock said assets from further transactions; and transferring said commodity between said first and said second customer.

10. The method of claim 9 further comprising generating an offer corresponding to said order after said order has been securitized.

11. The method of claim 10 further comprising presenting said offer to said second customer, said response being generated after said offer is presented to said second customer.

12. The method of claim 11 further comprising generating a plurality of orders for said commodity by a plurality of customers, posting said orders as offers on a data base of said server and presenting said offers to said second customer.

13. The method of claim 12 wherein said response is generated by selecting one of said orders presented to said second customer.

* * * * *